Jan. 16, 1945.   F. F. PEASE   2,367,310
CUTTING AND SPACING DEVICE
Filed Nov. 29, 1941   4 Sheets-Sheet 1

INVENTOR.
FRED FORREST PEASE
BY
ATTORNEY.

Jan. 16, 1945.　　　　F. F. PEASE　　　2,367,310
CUTTING AND SPACING DEVICE
Filed Nov. 29, 1941　　　4 Sheets-Sheet 2

INVENTOR.
FRED FORREST PEASE
BY Hoguet, Neary & Campbell
ATTORNEY.

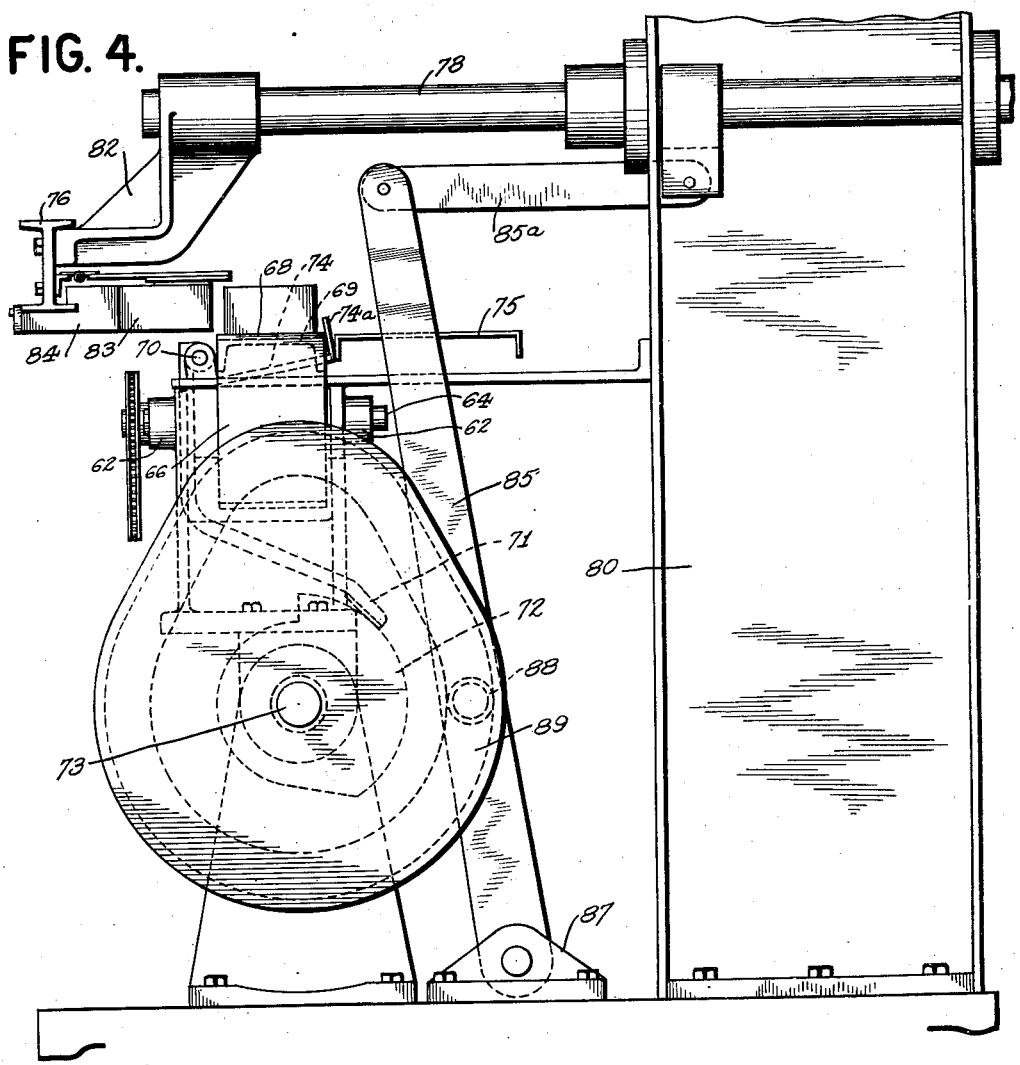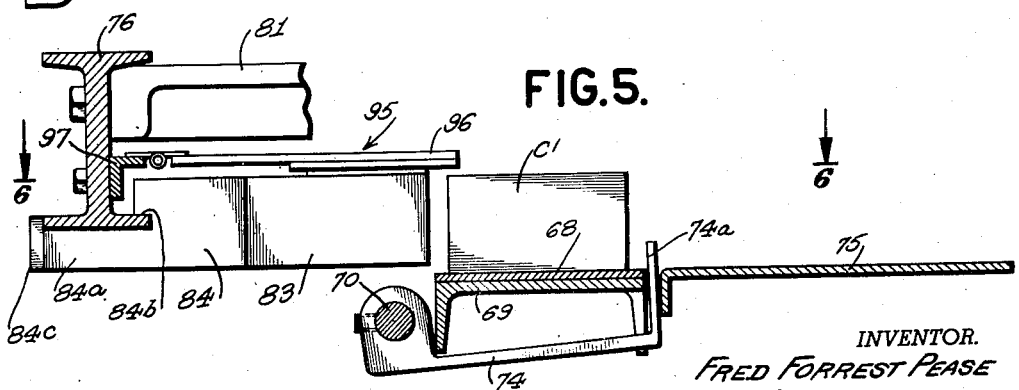

Patented Jan. 16, 1945

2,367,310

UNITED STATES PATENT OFFICE 2,367,310

CUTTING AND SPACING DEVICE

Fred Forrest Pease, Squantum, Mass., assignor to Lever Brothers Company, Cambridge, Mass., a corporation of Maine Application November 29, 1941, Serial No. 421,047

10 Claims. (Cl. 25—106)

This invention relates to apparatus for handling moldable material and relates particularly to apparatus for cutting bars of material of the type of soap into smaller units and for spacing said units suitably for further treatment, such as for example, cooling, hardening and drying.

Apparatus of the type embodying the present invention may be constructed and arranged to sever bars of plastic material such as soap into a plurality of cakes of equal thickness and having smooth even surfaces requiring little, if any, further treatment to render them suitable for packaging and sale. The apparatus may then separate or space the cakes apart in a plurality of discontinuous rows to expose the freshly cut surfaces of the cakes and permit them to be dried, cooled or hardened as may be desired.

More particularly, apparatus embodying this invention may include a novel cutting mechanism which overcomes the disadvantages of known types of cutters, commonly used for dividing plastic masses, namely, the formation of rippled surfaces, ragged or crumbled edges and scratched or marred cut surfaces on the cakes, by severing the cakes with thin, sharp blades which are rigidified by maintaining them under high tension stresses. The sharp cutting edges of these blades sever the bars cleanly, will not drift laterally to vary the thickness of the cakes and will not vibrate to impart a rough or rippled surface to the cakes.

The invention further includes a novel mechanism for supporting the blades with capacity for adjustment to permit their spacing to be varied whereby the bars may be divided into cakes of different width and of closely controlled dimensions. Other cooperating mechanism, including members for pushing the bars through the blades and for wiping the blades, may be similarly adjusted to assure proper operation of the cutting device.

The invention may further include a mechanism for separating the cakes into a plurality of rows in which the positions of the cakes may be predetermined so as to permit them to be removed and acted upon by other automatic devices, if desired. The spacing mechanism may include a pusher member and cooperating stop or obstructing members which act to prevent movement of certain of the cakes while other cakes are displaced into spaced apart positions and then to move all of the cakes in their spaced relation into positions for further treatment.

The cutting and spacing apparatus are operated in timed relation so that successive bars of plastic material may be fed to the cutting mechanism, severed into cakes and the severed bar delivered to the spacing mechanism where the cakes are separated into a plurality of rows of spaced apart cakes.

For a better understanding of the present invention reference may be had to the accompanying drawings, in which Figure 1 is a view in front elevation of a typical form of cutting and spacing device embodying the present invention;

Figure 4 is an end view of the spacing mechanism looking in the direction of the arrows 4—4;

Figure 5 is a view in section of a detail of the cake spacing device;

The form of the invention illustrated herein is applicable to the cutting and spacing of many different types of moldable materials and will be described herein with reference to its use in cutting bars of soap into cakes and spacing the cakes so as to permit their freshly cut surfaces to be cooled and hardened.

Figure 1:
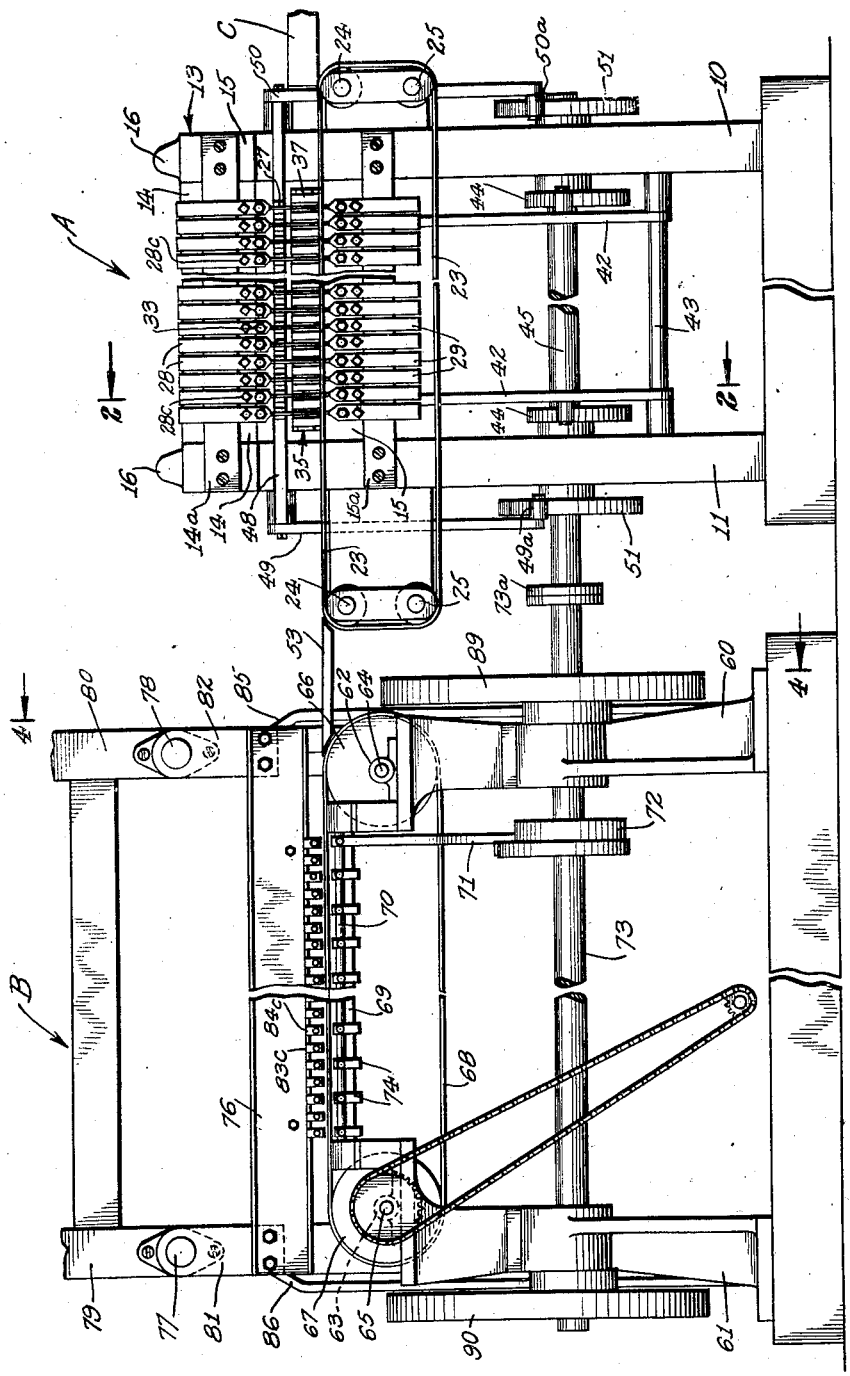

As illustrated in Figure 1, a typical form of cutting and spacing device includes a cutting device A and a spacing device B in alignment therewith so that bars of soap C may be fed into the cutting device, severed and cut into a plurality of cakes, the severed cakes delivered in alignment into the spacing device B where they are separated into a plurality of rows of cakes, thereby exposing the freshly cut side surfaces of the cakes so that they may be subsequently handled and treated, if desired.

Figure 2:
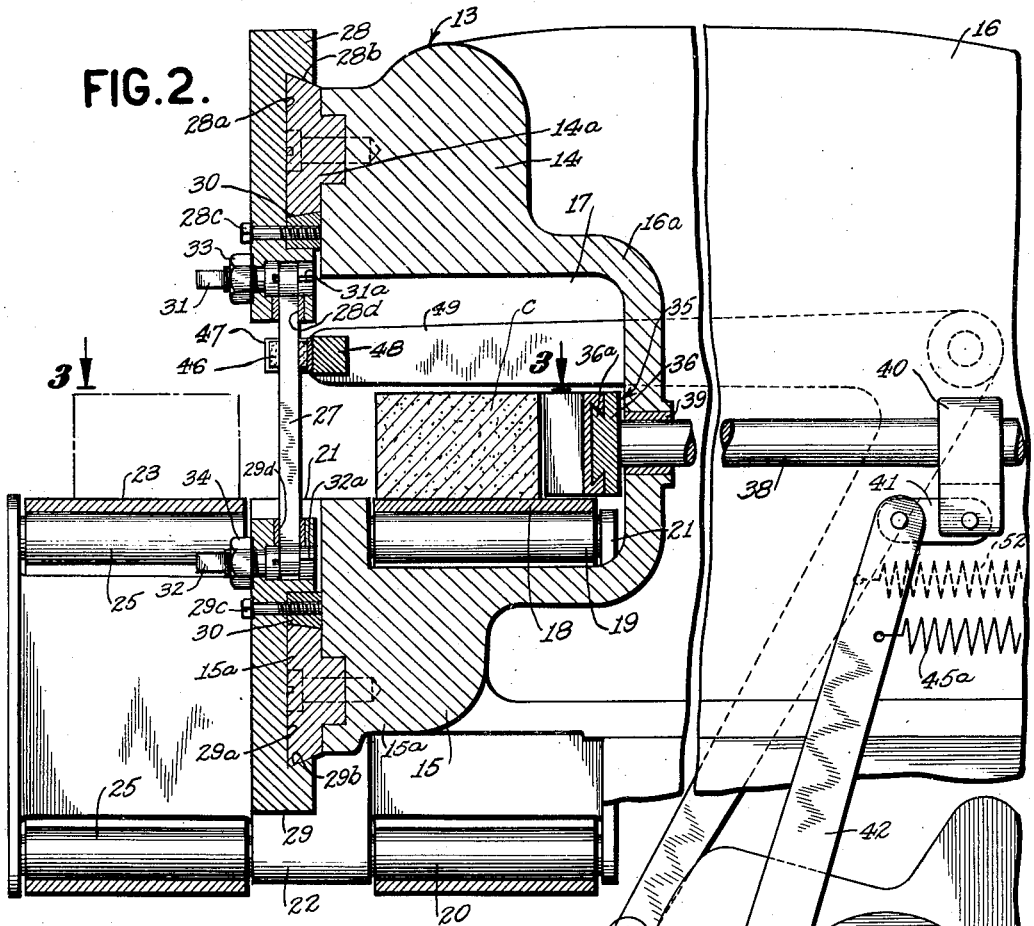
Figure 2 is a view in section taken on line 2—2 of Figure 1.

The cutting device A as shown particularly in Figure 1, includes a pair of spaced apart standards 10 and 11 which support at their upper ends a strong rigid framework 13 (Figures 1 and 2) which supports the cutting elements later to be described. While only two standards 10 and 11 are illustrated, a greater number of standards may be provided if the cutting device is of considerable length in order to impart longitudinal rigidity to the supporting frame 13. As shown in Figure 2, the supporting frame 13 includes a pair of parallel elongated supporting members 14 and 15 formed of heavy metal which are supported by a series of heavy webs 16 extending rearwardly therefrom. The webs 16 are formed with recesses 17 in their front center edges defining a cavity for receiving a conveyor belt 18 that delivers the bar of soap C into a position between the supporting members 14 and 15. As shown in Figure 2, the conveyor belt 18 is supported at each end by a pair of spaced rollers 19 and 20 which are journaled in suitable flanges 21 and 22 fixed to the ends of the supporting member 15.

A second conveyor belt 23 is similarly supported on the pairs of rollers 24 and 25 at each end of the member 15 with its upper flight substantially in the same plane as the upper flight of the conveyor belt 18.

The cutting mechanism for dividing the bar of soap C into a plurality of cakes including a plurality of thin flexible knife blades 27 which are disposed vertically between the conveyor belts 18 and 23 and are supported from the longitudinal supporting members 14 and 15 respectively. The supporting construction for the knife blades may include a pair of supporting and tensioning blocks or hangers 28 and 29 for each blade 27 which are adjustable lengthwise of the supporting members 14 and 15 respectively. In order to permit adjustment of the blocks 28 and 29 they are provided with recesses 28a and 29a respectively, each having an undercut edge 28b and 29b for receiving a complementary shaped bar 14a and 15a fixed to the front of the supporting members 14 and 15 respectively. Preferably the recesses 28a and 29a are slightly wider than the bars 14a and 15a so that tapered keys 30 may be inserted in the recesses 28a or 29a to retain the blocks 28 and 29 on their respective supporting members. The blocks 28 and 29 may be locked in position by bolts 28c and 29c extending through the blocks 28 and 29 and threaded into the keys 30.

The knife blades are tensioned to prevent vibration during a cutting operation so that the cakes will be severed cleanly and will have smooth even surfaces. The tensioning means illustrated in Figure 2 may include members 31 and 32 having threaded ends which are rotatably supported in the blocks 28 and 29 and which are provided with lock nuts 33 and 34 for retaining them in adjusted postion. The threaded members are provided with slots 31a and 32a which may be aligned with the slots 28d and 29d in the ends of the blocks 28 and 29. The ends of the blades 27 may be passed through the slots 28a and 29a into the slots 31a and 32a. When the members 31 and 32 are rotated, the blades 27 are wound up on the threaded members to place them under tension. After adjustment of the threaded members 31 and 32, the lock nuts 33 and 34 may be tightened against the blocks 28 and 29 to retain the blades in tensioned condition.

Inasmuch as the blades individually are stressed axially, their collective stresses are such as to require the supporting members 14 and 15 to be of great strength, as indicated above. As shown particularly in Figure 3, the blades 27 have cutting portions of triangular cross-section, this shape having been found to produce a cleaner and smoother cut than any other form of knife blade tested.

Figure 3:
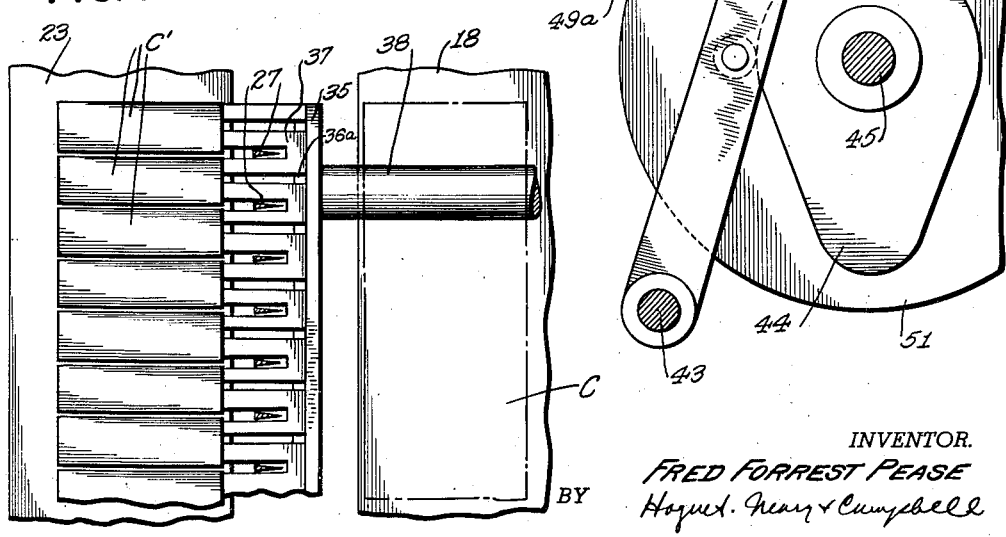
Figure 3 is a view in section taken on line 3—3 of Figure 2.

In order to sever the bar C into the cakes C', the bar C is pushed from the conveyor belt 18 through the knives 27 and delivered to the conveyor belt 23 by means of a pusher member 35. The pusher member 35 consists of an elongated bar 36 having a dove-tailed rib 36a on its surface for receiving a plurality of slotted blocks 37 for pushing the soap cakes C' through and beyond the knife blades 27, as illustrated in Figure 3. The pusher blocks 37 are adjustable lengthwise of the pusher bar 36 in a manner similar to the knife supporting blocks 28 and 29 so that the spacing between the knives 27 may be regulated to cut cakes of varying thickness. This arrangement of the adjustable knives 27 and the adjustable pusher blocks 37 permits a wide variation in the thickness of the cakes to be severed without modification of the apparatus.

The pusher member 35 is supported by two or more shafts 38 which are slidably mounted in bearings 39 in a U-shaped web 16a which extends between the webs 16. Each of the shafts 38 has a member 40 adjacent its outer end which is connected by means of a link 41 to a lever 42 that is journaled on a shaft 43 extending between the uprights 10 and 11. Each of the levers 42 is actuated by means of a cam 44 fixed to a drive shaft 45 extending between the uprights 10 and 11 and is actuated by any suitable source of power to cause the pusher member 35 to advance. The springs 45a retract the pusher member 35.

Inasmuch as in the treatment of moldable materials there is a tendency for a small amount of the material to stick to the knife blades 27 and to mar the cut surfaces of subsequently cut cakes, a wiping means is provided for cleaning the blades after the cutting of each bar C. The wiping means may include split pads 46 formed of felt or other compressible material which are held in clips 47 secured to the outside face of a bar 48 supported at its ends by a pair of bell crank levers 49 and 50 which are pivotally supported on the outer sides of the uprights 10 and 11. The lower ends of the bell crank levers 49 and 50 are provided with rollers 49a and 50a and which are urged against the surfaces of suitable cams 51 which are fixed to the shaft 45 and rotate therewith by means of the springs 52. The relationship of the cams 44 and 51 is such that the pusher member 35 advances to force the bar of soap C through the knives 27, then retracts and thereafter the wiping pads 46 are moved up and down along the blades 27 before the pusher member again advances. It will be understood that the pads 46 may be adjusted lengthwise of the bar 48 in order to align them with the cutting blades 27.

The conveyor members 18 and 23 preferably are moved intermittently by any suitable means so as to deliver the bar of soap behind the blades 27, then remain stationary while the bar is being cut and thereafter advance to deliver another bar C behind the cutting members, to carry away the bar which has been severed into the cakes C' and push the cakes across the platform 53 to the spacing device B.

With the type of cutting device A described, involving the use of thin sharp cutting blades, it has been found that the bar C is divided into cakes without substantial separation of the cakes. Inasmuch as the cutting operation imparts very smooth even surfaces to the cakes, it has been found that they cohere tenaciously and it is difficult to separate one cake from another with a conventional spacing mechanism. The cake spacing device B is provided in order to facilitate the separation of the cakes into rows in which the cakes are spaced apart so that their surfaces may be hardened, cooled or dried, as may be desired.

A form of cake spacing apparatus embodying the invention is illustrated in Figures 1 and 4 to 8 inclusive. In the illustrative form of the invention, the device includes a pair of standards 60 and 61 having pairs of journal blocks 62 and 63 at their upper ends. The journal blocks 62, 63 receive shafts 64 and 65 carrying the pulleys 66 and 67 that support a conveyor belt 68. A channel member 69 is connected to the standards 60 and 61 and underlies and supports the upper flight of conveyor belt 68. Extending along the left-hand side of the channel member 69 (Fig. 4) is a shaft 70 having a downwardly and rearwardly directed lever 71 thereon which cooperates with a cam 72 that is fixed to a drive shaft 73 which is journaled in the uprights 60 and 61, and is connected by a suitable coupling 73a to the shaft 45.

Figure 7:
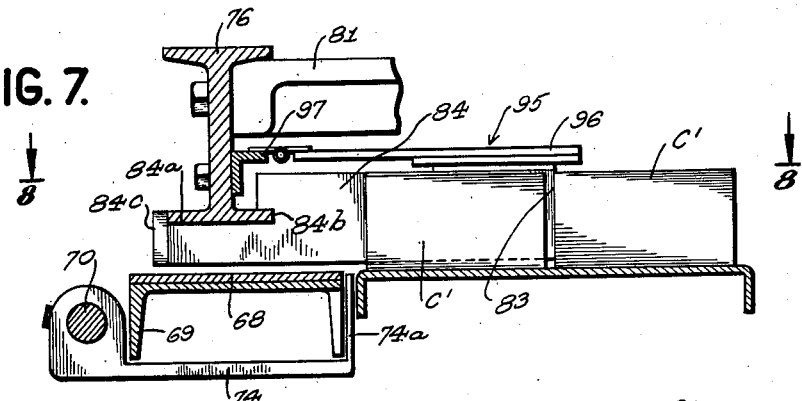
Figure 7 is a view in section illustrating the device of Figure 5 in a different operating position.

The shaft 70 is provided with a plurality of spaced apart fingers 74 which are fixed to the shaft 70 and have upturned ends 74a that lie along the right-hand edge of the conveyor belt 68, as viewed in Figure 4. Oscillatory movement of the shaft 70 under the control of the cam 72 moves the upturned ends 74a of the fingers 74 from a position below the upper surface of the conveyor belt 68, as shown in Figure 7, to a position above the upper surface of the conveyor belt 68, as shown in Figures 4 and 5. The fingers 74, in their raised positions, will intercept every other cake C' in a row, while permitting movement of the other cakes relatively thereto.

The mechanism for spacing the cakes and removing them from the conveyor belt 68 to another support 75, for example, may include an elongated I-beam 76, adjacent the left-hand edge of the conveyor belt 68, as viewed in Figure 4, which is supported by shafts 77 and 78 at opposite ends thereof. The shafts are slidably mounted in uprights 79 and 80 disposed rearwardly of the uprights 60 and 61 and substantially in alignment therewith. Suitable brackets 81 and 82 may be mounted on the ends of the shafts 77 and 78 to support the I-beam 76 in its desired relation to the conveyor belt 68.

A plurality of pusher fingers 83 and 84 are adjustably mounted on the lower flange of the I-beam 76. As illustrated, the pusher fingers 83 are substantially longer than the pusher fingers 84 so that upon engagement of the cakes C' by the pusher fingers 83, the cakes in alignment therewith are displaced a distance at least equal to their length before the intermediate cakes are engaged by the fingers 84.

The pusher fingers 83 and 84 are advanced across the conveyor 68 and retracted by means of a pair of levers 85 and 86 at opposite ends of the device which are pivotally supported on blocks 87 at the base of the machine and are connected by means of the links 85a to the shafts 77 and 78. The levers 85 and 86 are provided with cam rollers 88 which engage in cam tracks on the cams 89 and 90 fixed to the shaft 73. The cams 89 and 90 are so designed that for each revolution thereof, the I-beam 76 is advanced and retracted quickly and then remains stationary for a sufficient length of time to permit another row of cakes to be delivered in front of the pusher fingers 83 and 84.

Figure 6:
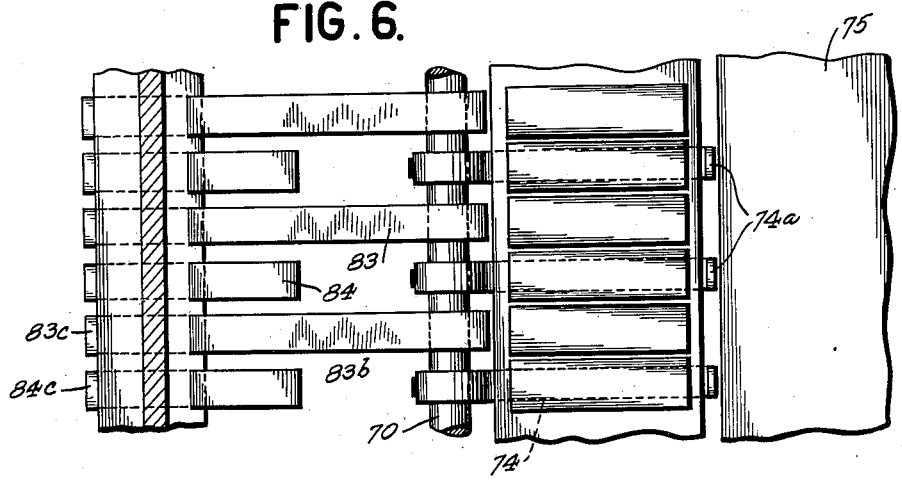
Figure 6 is a view in section taken on line 6—6 of Figure 5.
Figure 8:
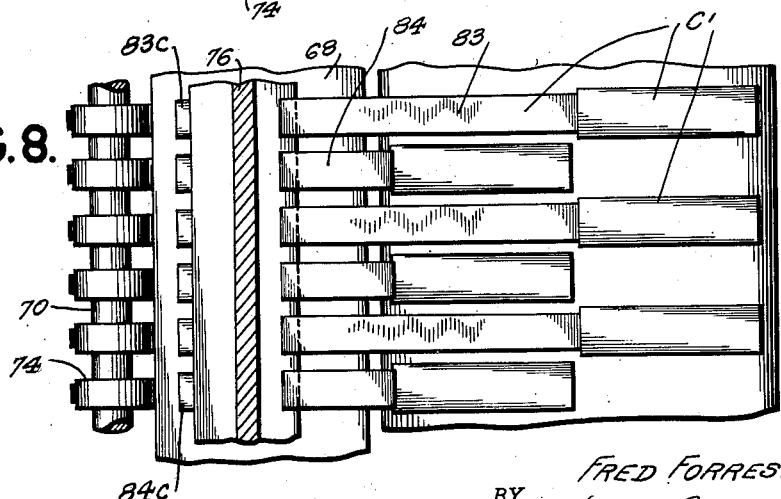
Figure 8 is a view in section taken on line 8—8 of Figure 7.

In operation, a row of cakes C' in face-to-face engagement is delivered by the conveyor member 68 in front of the pusher fingers 83 and 84. The obstructing fingers 74 are then rocked to the position shown in Figures 4 and 5 behind the cakes C' which are in alignment with the shorter pusher fingers 84. The pusher fingers 83 and 84 supported on the I-beam 76 are then advanced across the conveyor belt 68 with the fingers 83 first engaging the cakes C' between the obstructing fingers 74a, as illustrated in Figure 6. As the pusher fingers advance, the cakes engaged by the fingers 83 are pushed across the surface of the conveyor belt, while cakes in alignment with the fingers 84 engage the obstructing fingers 74a and are retained on the conveyor 68. Shortly before the pusher fingers 84 come into engagement with the cakes which are retained by the obstructing fingers 74, these fingers drop below the surface of the conveyor belt 68 permitting the fingers 84 to advance or push the lagging cakes from the conveyor belt 68 on to the receiving member 75. Inasmuch as the pusher fingers 83 also continue to advance, the cakes C' are disposed in two spaced rows on the receiving member 75, as illustrated in Figure 8.

Inasmuch as the thickness of the cakes may be varied by the adjustment of the cutting blades in the cutting device A, it is desirable to adjust the position of the pusher fingers 83 and 84 to correspond to the positions of the cakes. This is accomplished by providing extensions 83a, 84a on the rearward end of each of the fingers 84 which underlies the bottom flange of the I-beam 76 and notching the intermediate portion of the pusher fingers as at 83b and 84b to receive a portion of the flange of the I-beam 76. Positioning blocks 83c and 84c are detachably connected to the end of each of the fingers 83 and 84 respectively which clamp the fingers in position on the lower flange of the I-beam 76.

Inasmuch as there is sometimes a tendency for the cakes to tilt slightly as they are pushed from the conveyor belt 68, hold-down devices 95 may be provided for preventing this tilting movement. Each hold-down device consists of a weighted plate 96 which is hingedly connected to an angle iron 97 fixed to the inner surface of the I-beam and rests on top of the pusher fingers 83. This plate will rest upon the top of the pusher fingers but can be lifted out of the way if it is desired to free or remove a damaged cake from the device.

From the preceding description of a typical form of device embodying the present invention, it will be clear that a cutting and spacing device has been provided which will assure the formation of cakes or units having smooth even surfaces and will separate such normally cohesive cakes into the desired spaced rows of cakes so that their surfaces may be exposed for cooling, drying or hardening and for such other treatments as may be desired.

It will be understood, moreover, that the shape, proportions and capacity of the device may be varied as the purpose demands and, therefore, the form of the device disclosed should be regarded as illustrative only and not as limiting the scope of the following claims.

I claim:

1. A cutting device comprising a plurality of parallel cutting knives of substantially triangular cross-section, means for supporting and tensioning said knives, means for delivering a bar of material behind said knives, means for pushing said bar through said knives to sever it into a plurality of cakes including a bar having a plurality of pusher members adjustably mounted thereon, said members having slots in their faces for receiving said knives, means movable lengthwise of and in engagement with said knives for wiping said knives, and means for reciprocating said pushing means and said wiping means in timed sequence.

2. In a cutting device the combination of a pair of spaced apart substantially parallel belt conveyors, a pair of supporting members spaced, respectively, above and below the upper flights of said conveyors, a plurality of thin, flexible knife blades extending between and adjustable lengthwise of said supporting members and between said conveyors, means on one of said supporting members for tensioning and rigidifying said knife blades, a pusher member overlying one of said conveyors, means for advancing said pusher member to force a bar of material on said one of said conveyors through said knives to divide said bar into cakes and deposit the cakes on the other conveyor, said pusher member having a plurality of slotted facing blocks adjustably mounted thereon for straddling said knives to push said cakes beyond said knives, means for actuating said one of said conveyors to deliver said bar between said knives and said pusher member, and means for actuating said other conveyor to carry away the cakes deposited thereon.

3. In a cutting device, the combination of a pair of substantially vertically spaced apart parallel supporting members, a plurality of knife supporting members supported on said supporting members for adjustment lengthwise thereof, thin flexible knife blades fixed to the knife supporting members in parallel relationship, a pusher member having a plurality of vertically slotted facing elements adjustably mounted thereon adapted to straddle said knives, conveying means for delivering a bar of material between said pusher member and said knives, means for advancing said pusher member to force said bar through said knives to divide said bar into cakes, and conveying means adjacent to said knives for receiving said cakes.

4. In a cutting and spacing device, the combination of a conveyor for delivering a bar of material, a pair of knife supporting members disposed respectively above and below the upper flight of said conveyor, a plurality of vertically disposed knife blades fixed to said supporting members and extending adjacent to one edge of said conveyor, means for pushing a bar of material from said conveyor through said knife blades to divide it into cakes, a second conveyor for receiving said cakes in the form of a bar, a second pusher member adjacent to said second conveyor having a plurality of alternately short and long fingers thereon, means for advancing said second pusher member to cause the long fingers to engage alternate cakes and push them from said second conveyor, stop means in alignment with the short fingers movable into positions above and below said conveyor, and means for moving said stop means to a position above said conveyor to retard the cakes in alignment with said short fingers and thereafter moving said stop means below said conveyor to permit said short fingers to push said cakes from said second conveyor.

5. In a cutting and spacing device, the combination of a plurality of parallel spaced flexible cutting knives, means for tensioning said knives, a conveyor for delivering a bar of material adjacent to said knives, means for pushing said bar from said conveyor through said knives to divide the bar into a series of aligned cakes, a second conveyor for receiving said aligned cakes, a pusher member adjacent to said second conveyor having a plurality of long and short fingers thereon, means for advancing said pusher member to push said cakes from said second conveyor, and stop means having a plurality of fingers in alignment with said short fingers movable from a position below said second conveyor to a position above said conveyor to intercept the cakes in alignment with said short fingers, and means for moving the fingers of said stop means to intercepting position to retain the last-mentioned cakes on said second conveyor until they are engaged by said short fingers, and thereafter moving said fingers to said position below said second conveyor.

6. In a cake spacing device comprising a conveyor for delivering a row of engaging cakes, an elongated member adjacent one edge of said conveyor, a plurality of pusher fingers adjustably mounted on said member for alignment with said cakes, some of said fingers being shorter than other fingers and interposed between said other fingers, a plurality of stop fingers adjacent the other edge of said conveyor and movable from positions beneath the upper surface of said conveyor to positions above said upper surface and in alignment with said shorter fingers, and means for advancing said elongated member and moving said stop fingers above the upper surface of said conveyor to retain the cakes in alignment with said shorter fingers on said conveyor until the longer fingers have pushed the cakes in alignment therewith from the conveyor, and then retracting said stop fingers to permit said shorter fingers to push the cakes in alignment therewith from the conveyor.

7. In a cake spacing device, the combination of a conveyor, an elongated member adjacent one edge of said conveyor, a plurality of pusher fingers adjustably mounted on said elongated member, said fingers being alternately long and short, means for moving said elongated member to cause said fingers to move across said conveyor from said one edge to the other edge of said conveyor, a plurality of spaced apart upwardly projecting movable stop fingers adjacent to said other edge of said conveyor, and means for moving said stop fingers from positions below the upper surface of said conveyor into positions above the upper surface of said conveyor and in alignment with said short pusher fingers and for returning said fingers to said positions below said upper surface of said conveyor.

8. A cutting device comprising a plurality of parallel cutting knives, means supporting said knives under tension, means for delivering a bar of material behind said knives, means for pushing said bar against and through said knives to sever said bar into a plurality of aligned cakes, conveyor means for receiving and carrying away said aligned cakes, an elongated member behind and extending at substantially a right angle to said knives, means on said member for wiping said knives, levers connected to the ends of said elongated member and pivotally movable about an axis remote from said knives, and means having cam surfaces for sequentially advancing and retracting said pushing means and thereafter rocking said levers to oscillate said wiping means lengthwise of said knives.

9. In a cutting device, the sub-combination of a pair of elongated parallel supporting members, a plurality of pairs of blocks slidably mounted on said supporting members for adjustment lengthwise thereof, one block of a pair being mounted on one supporting member and the other block of the pair being mounted on the other supporting member, means for fixing said blocks in adjusted positions relatively to said supporting members, a plurality of thin flexible knife blades extending in parallel relationship between each pair of the blocks, and means on one block of each pair for tensioning and rigidifying said knife blades extending therebetween, comprising a rotatable member mounted in said one block and extending at a right angle to the axis of the knife blade, means forming a slot in said member for receiving the end of a blade, means for rotating said member to wrap the blade around said member and tension said blade, and a lock nut threaded on said member and movable into engagement with said one block for locking said member against rotation to retain said blade under tension.

10. In a cutting device, the sub-combination of a pair of elongated parallel supporting members of substantially dove-tail cross-section, at least one block having a recess therein complemental to the cross-sections of said members slidably mounted on each of said supporting members for adjustment lengthwise thereof, an elongated flexible knife blade extending between said blocks, means on one of said blocks for anchoring one end of said blade to said block, a tensioning member rotatably mounted on the other block projecting at a right angle to the axis of the blade and having a slot for receiving one end of said blade, means for rotating said tensioning member to wind said blade about said tensioning member and a lock nut threaded on said tensioning member and movable into engagement with said other block for locking said tensioning member against rotation.

FRED FORREST PEASE.